United States Patent [19]

Mickeal

[11] Patent Number: 4,748,438
[45] Date of Patent: May 31, 1988

[54] SIGNAL PROCESSING APPARATUS FOR SELECTIVELY FILTERING DIGITAL SIGNAL PARAMETER PACKETS

[75] Inventor: James F. Mickeal, Ottawa, Canada

[73] Assignee: Her Majesty the Queen in right of Canada, as represented by the Minister of National Defence, Ottawa, Canada

[21] Appl. No.: 38,489

[22] Filed: Mar. 23, 1987

Related U.S. Application Data

[63] Continuation of Ser. No. 917,506, Oct. 10, 1986, abandoned.

[30] Foreign Application Priority Data

Oct. 29, 1985 [CA] Canada .................................. 494096

[51] Int. Cl.$^4$ .............................................. G06F 7/02
[52] U.S. Cl. .............................................. 340/146.2
[58] Field of Search ...................... 340/146.2; 364/724

[56] References Cited

U.S. PATENT DOCUMENTS

| | | | |
|---|---|---|---|
| 4,563,774 | 1/1986 | Gloge | 340/146.2 X |
| 4,674,039 | 6/1987 | Chouery | 340/146.2 X |
| 4,675,646 | 6/1987 | Lauer | 340/146.2 |

Primary Examiner—David H. Malzahn
Attorney, Agent, or Firm—Sheldon Kanars; John K. Mullarney

[57] ABSTRACT

A direct access filter includes an array of memories for processing digital signal data from signal sources such as sensors in a radar system. The parameters in a packet are tested against a predetermined set of corresponding data. Each set of data can be considered as a window. If the value of each tested parameter falls within the window, then the packet matches the filter criteria. There can be several sets of filter criteria, and hence all sets must be sequentially tested. Upon finding a filter match, two actions can result: "excision", wherein occurrence of a match results in that parameter packet being discarded from the data flow, or "track", which results in the transfer of the parameter data to a follow on processor. Processing time is saved when a match occurs and no updating of previous data is required.

6 Claims, 1 Drawing Sheet

SIGNAL PROCESSING APPARATUS FOR SELECTIVELY FILTERING DIGITAL SIGNAL PARAMETER PACKETS

This is a continuation application of copending application Ser. No. 917,506, filed Oct. 10, 1986, now abandoned.

BACKGROUND OF THE INVENTION

1. Field of the Invention

This invention relates to signal processing apparatus and particularly to a circuit for processing digital signal data from signal sources such as sensors in a radar system.

2. Description of the Prior Art

In systems in which a relatively small number of signal sources generate a large amount of high speed data, such as in radar systems, adaptive signal tracking and excision is often used. In such systems, sensors monitor an external environment and report parameter packets, each parameter packet containing data related to each event that is detected from any of these signal sources. Thus, for example, the signal sources can be scanned and data received therefrom packetized for transmission to a processor. The data within these parameter packets represent a set of uniquely different measurements of the signal, for example, frequency, amplitude, etc.

If it is expected that the measured parameters for any particular signal source do not rapidly change in time, and are significantly different from parameters measured from other sources, the signal from a selected signal source can be filtered on the basis of the values of the detected parameters.

The filtering process, in general, involves testing each of the parameters in a packet against a predetermined set of corresponding data. Each set of data can be considered as a window. If the value of each tested parameter falls within the window, then the packet matches the filter criteria. There can be several sets of filter criteria, and hence all sets must be sequentially tested.

Upon finding a filter match, two actions can result: "excision", which means that upon a match, that parameter packet is discarded from the data flow, or "track", which results in the transfer of the parameter data to a follow on processor.

If the filtered data signal is input to a signal processor, the processor can set up the filter criteria based on some sort of adaptive criteria. The adaptive criteria algorithms usually attempt to sort the packets into uniquely different signal tracks and after a sufficient number of packets are received for a particular track, the filter is given an excision parameter set. Adaptive excision, in this context, minimizes the data flow to the processor, since it tends to be responsive to only new signal sources.

A similar approach can be used to track signals, where the processor can direct the filter to pass packets which fit a given set of parameters and reject all others.

However in such systems, the existing window criteria must be sequentially compared to the corresponding signal parameters. For a large number of stored filtered parameter sets, the maximum input data rate is limited by the speed at which the hardware can perform that number of sequential comparisons.

It is possible to eliminate the sequential parts of the process if all comparisons are performed in parallel. However this would require a larger number of data registers and associated comparators if the number of parameter sets is large.

SUMMARY OF THE INVENTION

In the present invention, both the hardware and comparison time is minimized by the use of a directly accessed array of randon access memories or RAMs. Each memory is typically 1 bit wide, by a length corresponding to a maximum amplitude of the parameter signal to be received. In each memory, all ones or zeroes are stored at address locations corresponding to the individual parameter signals, while the other of the ones or zeroes are stored at all other memory locations.

Hence when an individual parameter signal is applied to the address line of that memory, and where the individual parameter signal enables the particular address lines which correspond to the memory locations where all ones are stored, ones are the output at the memory data lines. On the other hand if the individual parameter signal does not correspond, other address lines will be enabled and the output signal will be a mixture of ones and zeroes.

Using a group of memory signals, having address lines to which the parameter signals of a packet are applied, all of the output data lines are applied to an AND gate circuit. If all of the memory outputs are true, a match signal appears at the output of the AND gate circuit. This is applied to the input of an Exclusive OR circuit, and an excision signal is applied to the other input of the Exclusive OR circuit. If the excision signal is true, the matched signal output of the AND gate becomes inverted. This signal is applied to the input of an accept AND gate with a strobe signal. The resulting accept signal at the output of the AND gate will therefore be removed. Occurence of a match requires no updating of data and thus saves processing time.

If the parameters do not completely match a set of windows, the accept signal becomes active, thus allowing the transfer of the parameter data for that signal to a processor. The accept signal thus either enables or inhibits the processor.

If the excision signal is false, the accept signal is active, and the processor can track the signal parameter packets only when the match signal becomes true for particular parameter packets.

Using the aforenoted approach, speeds of up to 20 MHz may be achieved with a minimum of hardware. It should be noted that rather than storing ones, zeroes can be stored in the memory at the required address locations, assuming that the polarity of the signals are conformed to provide the match and accept signals described above. In this case, the AND gate circuit should be changed to a NOR gate circuit. The provision of such inversions can be readily accomplished in a known manner.

The desired system includes a direct access filter for a digital signal parameter packet having a group of memories each containing a data signal consisting of predetermined all "ones" or all "zeroes" at addressable storage locations corresponding to an individual parameter signal, and the other of "ones" or "zeroes" at its other storage locations. Each memory is addressed with addressed signals corresponding to parameter signals of a packet, whereby an output signal is produced being all predetermined ones or all zeroes if an addressed parameter signal corresponds to the individual parameter signal. The output signals from each memory are compared to provide a matched signal if all the output signals are ones or zeroes. An accept signal derived from the matched signal, as well as the signal parameter packet can be provided to a processor, the accept signal enabling or inhibiting the processor from processing the signal parameter packet.

The comparison is done in an AND gate if the data signal consists of all "ones" or a NOR gate if the data signal consists of all "zeroes".

A better understanding of the invention will be obtained by reference to the detailed description below, in conjunction with the following drawings.

DESCRIPTION OF THE PREFERRED EMBODIMENTS

Figure 1:
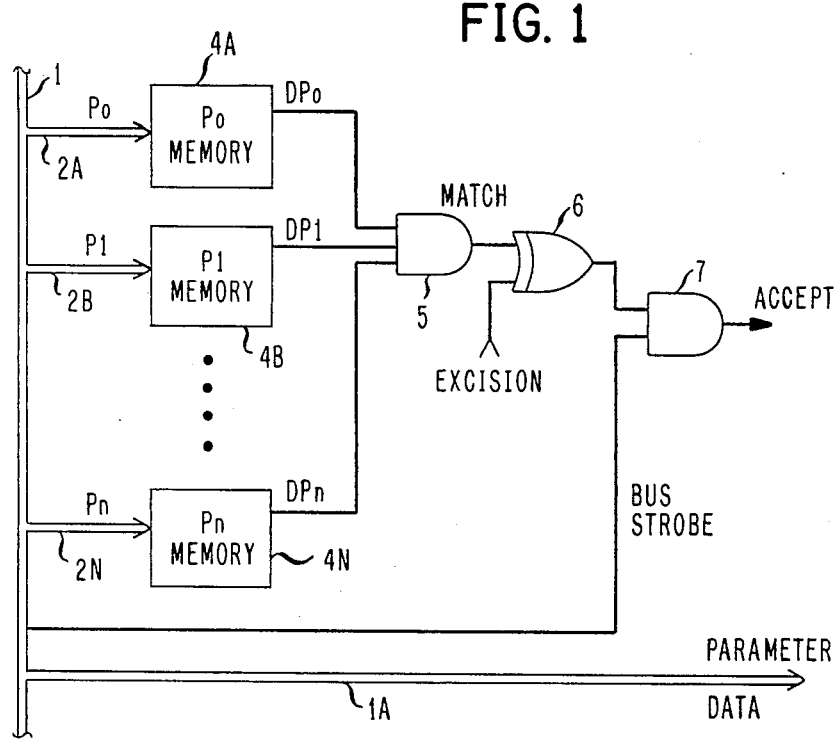
FIG. 1 is a block diagram of a first embodiment of the invention.

Digital signal parameter packets are carried by a bus 1 and are applied via address lines 2A–2N to address inputs of corresponding random access memories 4A–4N. The parameter signal is preferred to be indicated to be valid by the transmission of a bus strobe signal on bus 1.

Each RAM 4A–4N has previously been loaded with a sequence of bit patterns which indicate what address ranges are to be considered windows. Hence all addresses which translate to data which is within the specified window in each memory are initialized as ones, wherein ones are stored at the address locations corresponding to the individual parameter signal in the packet which is to be received on the address line.

It should be noted that if two filter parameter sets have been defined for a single memory, then two windows for that memory can be specified. All addresses which translate to data for that memory which are within the two specified windows are then initialized with ones, while all other memory locations are initialized with zeroes.

Once signals have been received on the data bus, the parameter memories are thereby addressed and provide data bits indicating window matches. If all parameter matches occur, the data output signals are true (i.e. all ones). The data output signals are applied to individual ports of a match AND gate circuit 5. If all parameter matches occur, and the output signals of the memories 4A–4N are true, a match signal is generated at the output of match AND gate circuit 5.

Addresses in the memory can alternatively be initialized with zeroes. If so the AND gate circuit 5 should be changed to a NOR gate.

The output of AND gate 5 is applied to one input of an Exclusive OR gate 6. An excision signal is applied to the other input of gate 6, shown as EXCISION.

If the circuit is to be used as an excision filter, a true signal is applied on the EXCISION input, and the input signal to the Exclusive OR gate 6 from AND gate 5 becomes inverted at its output. The output signal from Exclusive OR gate 6 is applied to one input of AND gate 7. The bus strobe signal is applied to the second input of AND gate 7.

The output signal of AND gate 7, referred to as an accept signal, can be used as an enable/inhibit signal to a following processor, not shown. The parameter data is presented to the processor from bus 1 on bus 1A. Thus the parameter data with the accept signal false, will inhibit further processing of the parameter data.

In summary of the above process, a matching of the input signal with the windows stored in the memories, results in no processing of the parameter data by the processor. Thus no updating of the data previously received is required, and processor time has been saved.

On the other hand, if the parameters received do not completely match a set of window data stored in memories 4A–4N, the accept signal at the output of AND gate 7 becomes true and active, thus enabling the following processor. The processor thus will accept the parameter data from bus A1.

If it is desired, the processor can then update the window data in the memories to windows corresponding to the new parameter data. If the next following packet matches, the accept signal at output of AND gate 7 is false, inhibiting the processor from processing the instant parameter data. In this manner the circuit described herein can be made adaptive to the input parameter data. However should a match occur, processing time is saved.

If the signal on the EXCISION lead is changed to false, the accept signal at the output of the AND gate will be true when all parameter input signals match their respective windows. Thus when matches occur the processor is caused to track the input signal.

Figure 2:
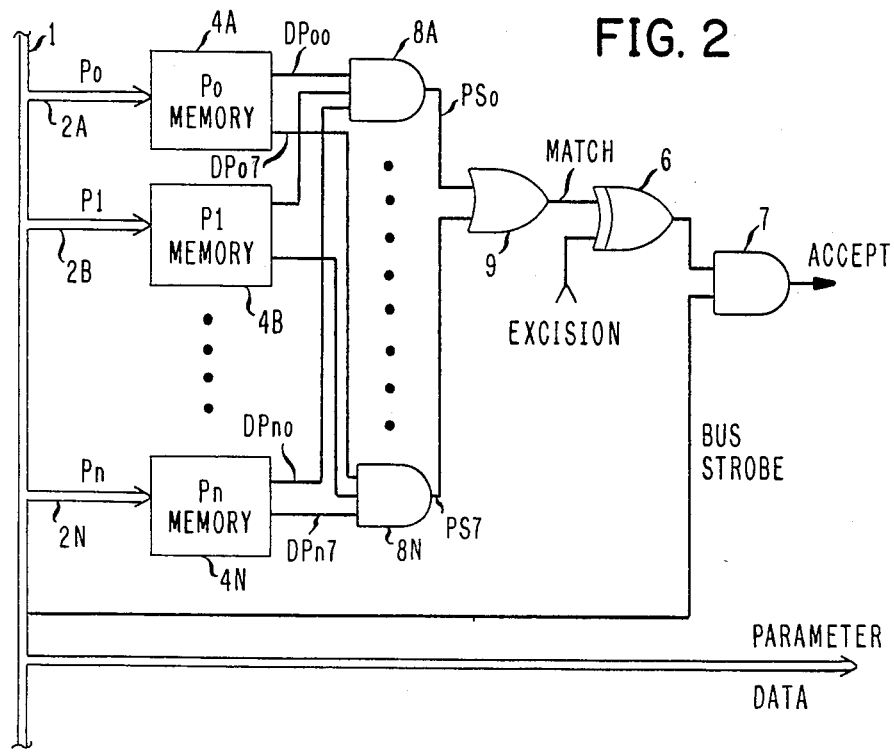
FIG. 2 is a block diagram of a second embodiment of the invention.

FIG. 2 illustrates a block diagram of a second embodiment of the invention which can be used to uniquely track n simultaneous parameters, Po-Pn respectively. Each of the memories 4A–4N, rather than being 1 bit wide as in the embodiment of FIG. 1, now are as many bits wide as there are simultaneous parameters to be tracked.

In order to track two signals for example, a window around each of the n parameters must be programmed into the parameter memories 4A–4N. The data for the first signal (the first parameter set) is composed of a sequence of 1's and 0's stored in the bit 0 location corresponding to outputs DPoo ... DPno of all parameter memories. The value of bit 0 for a particular parameter will be all 0's (false) for all addresses which are outside the parameter window, and 1's (true) for all addresses within the window.

The second parameter set is stored in the bit 1 location of all parameter memories. In the case in which each parameter memory is 8 bits wide, a maximum of 8 unique parameter sets can be accommodated. More parameter sets can be accomodated by simply employing wider memories.

Given that the parameter memories have been initialized with the required window data as discussed above, the tracking process occurs as follows upon the reception of any signal parameter set. The parameters for the received signals are simultaneously applied as addressed from bus 1 to each parameter memory. If the signal parameters fall within all of the windows of the first parameter set, then all 0 data will be true. The bit 0 outputs of each of the memories are connected to individual inputs of an AND gate 8A. When all of its inputs are true, its output PSO becomes true.

In a similar manner each of the corresponding bit location outputs of the memories 4A–4N are connected to individual inputs of corresponding AND gates 8A ... 8N. Thus when parameter matches occur, the corresponding outputs of the memories are true and the outputs PS0–PS7 of AND gates 8A ... 8N become true, indicating matches on the other parameter sets.

If the signals of interest are to be tracked, i.e. passed on for further processing, the occurence of any one of the PSO-PS7 true signals are applied to corresponding inputs of OR gate 9. With a signal on the EXCISION lead false, which lead is connected to one input of Exclusive OR gate 6, and the output of OR gate 9 being connected to the other input of Exclusive OR gate 6, a STROBE on the bus 1 is passed through the final AND gate 7 which has one input connected to the BUS STROBE lead and the other input connected to the output of Exclusive OR gate 6. The output of AND gate 7 is an ACCEPT signal on a similar labelled lead, which can then be used as an indicator to the subsequent processor that a signal has matched one or more parameter sets. It should be noted that if the PSO-PS7 signals are simultaneously sent to the subsequent processing circuits, those circuits could then know which parameter sets are involved.

EXCISION of selected signals can be performed using the same parameter initialization process as described above, that is, for each signal to be excised the corresponding parameter set bit in each memory is set true within the desired data window. For signals which lie within the programmed windows, however, the MATCH signal becomes inverted due to the signal on the EXCISION lead being false, and hence no ACCEPT signal is generated.

While the structure of the basic aspect of the invention has been described, it should be noted that a person skilled in the art understanding this invention may well prefer to add additional components. For example in order to store the data signals in the memories, write access thereto must be obtained. It is preferred to insert an address multiplexer between the bus 1 and the address lines of each memory. A computer or specialized processor can thus access the memory locations of the memories and initialize them, or update them with the data signals which define the parameter windows as described earlier.

During updating of the memories, of course, they cannot be addressed by the address signals corresponding to the parameter signals of the packets. In order to avoid the processing interruption, each memory can be duplicated, and each loaded in turn from the processor, and once loaded switched on line to receive the address signals from the bus. Thus each of the two memories is sequentially updated, and becomes active. In this manner parameter bus processing will only be interrupted during the switch time, which can be in the order of a few tens of nanoseconds.

It has been found that the circuit described above leads to the requirement for only a minimum of hardware and high speed, and economy of use of time of parameter data processors, since replication of discrete registers and comparators for each parameter set is eliminated.

A person skilled in the art understanding this invention may now conceive of alternate embodiments or variations thereof. All are considered to be within the sphere and scope of this invention as defined in the claims appended hereto.

What is claimed is:

1. A direct access filter for a digital signal parameter packet comprising:
    a group of memories each containing a stored data signal including predetermined all "1's" or all "0's" at addressable storage locations corresponding to an individual parameter signal, and the other of "1's" or "0's" at its other storage locations;
    means for addressing each memory with addressed signals corresponding to parameter signals of a packet to produce an output signal containing all predetermined "1's" or all "0's" if an addressed parameter signal corresponds to said individual parameter signal;
    means for comparing the output signals from each memory to provide a match signal if all said output signals are "1's" or "0's" corresponding to the respective stored signal;
    means coupled to the comparing means for providing an accept signal if all of said output signals are not "1's" or "0's";
    said means for providing an accept signal including an Exclusive-OR gate for receiving the output of said comparing means at one input and an excision signal at another input so that a true signal is provided at its output when the match signal is false and the excision signal is true, and an accept AND gate receiving the output signal from the Exclusive-OR gate at one input and a strobe signal at another input to provide an accept true signal at its output in response to a true signal from said Exclusive-OR gate, said accept AND gate providing a false signal at its output when the match signal input to the Exclusive-OR gate is true and said excision signal is true.

2. A filter as defined in claim 1 wherein said means for comparing the output signals from each memory to provide a match signal is a match AND gate receiving the output signals from said memories and providing said match signals if all of said memory output signals are said "1's".

3. A filter as defined in claim 2 wherein the accept AND gate is caused to provide an accept true signal when the excision signal is false and said match signal is true.

4. A direct access filter for digital signal parameter packets comprising:
    a group of memories each containing a plurality of stored data signals including predetermined all "1's" or all "0's" at addressable storage locations in each memory corresponding to individual parameter signals, and the other of "1's" or "0's" at its other storage locations;
    means for addressing each memory with address signals corresponding to individual parameter signals of respective packets to produce an output signal containing all predetermined "1's" or all "0's" if an addressed parameter signal corresponds to a particular individual parameter signal;
    means for comparing the output signals of the memories to provide one or more match signals if all of the output signals are "1's" or "0's";
    means coupled to the comparing means for providing an accept signal if all of said output signals are not "1's" or "0's";
    said means for providing an accept signal including an Exclusive-OR gate for receiving the output of said comparing means at one input and an excision signal at another input so that a true signal is provided at its output when the matach signal is false and the excision signal is true, and an accept AND gate receiving the output signal from the Exclusive-OR gate at one input and a strobe signal at another input to provide an accept true signal at its output in response to a true signal from said Exclusive-OR gate, said accept AND gate providing a false signal at its output when the match signal input to the Exclusive-OR gate is true and said excision signal is true.

5. A filter as defined in claim 4 wherein said comparing means comprises a plurality of AND gates each capable of providing a match signal, each AND gate connected to receive output signals from selected addressable locations of each of said memories corresponding to the data signals of a group and for providing a match signal if all of the memory output signals corresponding to a group of data signals are "1's".

6. A filter as defined in claim 5 wherein the accept AND gate is caused to provide an accept true signal when the excision signal is false and the match signal is true.

* * * * *